Feb. 11, 1969

C. PAGE 3,426,894

EGG TRANSFER AND WEIGHING APPARATUS

Filed May 29, 1967

INVENTOR
CLARENCE PAGE

BY *Whittemore Hulbert & Belknap*

ATTORNEYS

INVENTOR
CLARENCE PAGE

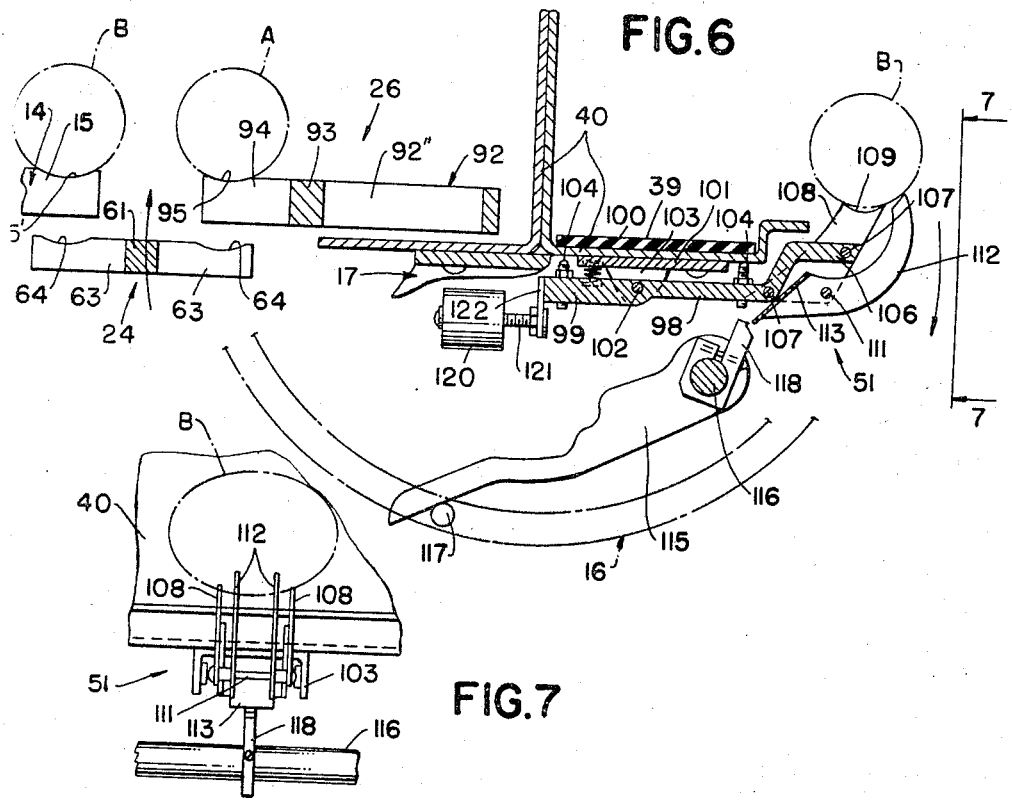
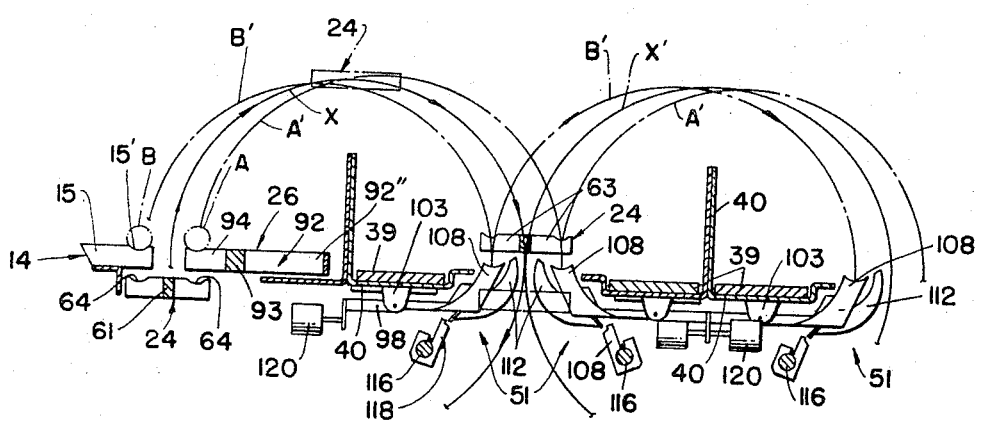

United States Patent Office 3,426,894
Patented Feb. 11, 1969

3,426,894
EGG TRANSFER AND WEIGHING APPARATUS
Clarence Page, 23275 Outwood, Southfield, Mich. 48075
Filed May 29, 1967, Ser. No. 642,051
U.S. Cl. 209—121
Int. Cl. A01k *43/08;* B07c *5/16;* B07b *13/08*
15 Claims

ABSTRACT OF THE DISCLOSURE

A machine is shown for grading eggs by weight which has a continuously traveling, spool-type egg supply conveyor delivering eggs to fixed egg-holding finger units spaced transversely of the direction of supply of eggs, the finger units corresponding in number with the egg-cradling lines of the conveyor. The eggs are transported through a succession of orbital transfer units and associated egg grading balance units. The transfer units each comprise an improved dual-type, circularly orbiting bar adapted to receive and transport double the number of eggs to the balance units.

In order to transport from the fixed holding unit to the first orbital transfer bar a sufficient number of eggs to satisfy the doubled handling capacity of that bar, the machine incorporates a novel, oscillatory link-type egg pick-up and initial transfer unit or mechanism which is powered by interconnected chain, sprocket and gear means. This mechanism has fingers adapted to lift slightly a leading egg of two which occupy the fixed holding fingers, and to shift it preliminarily away from the trailing egg in the direction of egg transfer. The shift is sufficient to enable the dual-capacity orbital transfer bar of the first transfer unit to engage from beneath, lift and orbitally transport to a first set of egg-balancing units the two eggs referred to; and the operation is identically performed in succeeding pick-up and transfer cycles at the first transfer unit.

There is also disclosed an improved balance unit to grade or sort the eggs by weight, the improvements in the balance unit adapting it to the doubled egg-handling capacity of the remainder of the machine, particularly in regard to means for the spring-biasing of a balance arm of the unit and for the adjustment of a counterpoise acting on the arm.

BACKGROUND OF THE INVENTION

Field of the invention

The invention relates to the grading of eggs, and more particularly to a machine which evaluates the eggs by weight into the commonly accepted jumbo, extra large, large, medium, small, and peewee sizes. In such a machine, eggs are furnished by a continuously driven supply conveyor, and pass successively through transfer mechanisms which successively deposit eggs on counterpoised balance units. An egg which over-balances the scale of the first of these units is automatically discharged from the latter, as being a jumbo size, onto a continuously driven, transversely extending conveyor belt, by which it is carried to a disposal point for cartoning or crating. The same action occurs as progressively diminishing sizes or weights of eggs are transferred and handled by the remainder of the transfer and weighing balance units.

Description of the prior art

The most pertinent prior art of which I am aware is the patent to George A. Page, No. 2,731,146, of Jan. 17, 1956, which discloses a generally similar type of egg supply, egg receiving, orbital egg transfer, and weight balance units, but lacks the dual-capacity egg-handling fingers of the present improvement, the dual belt delivery means for graded eggs at each of a number of transfer stations, and dual balance units at each station. Most importantly, the machine of the patent lacks an essential improvement of the present invetnion, i.e., an oscillatory-type egg pick-up and transfer mechanism, by which leading and trailing eggs arriving from the supply conveyor are longitudinally separated into two substantially spaced rows, and held in this spacing pending their engagement and lifting from beneath by the dual capacity transfer bar of the first transfer unit. This sets the stage for the subsequent dual-capacity action of succeeding transfer and weight balance units; and it accounts for the doubling of the capacity of the machine, as a whole, by comparison with one of equal size in accordance with the Page patent.

Another patent granted to Clarence Page et al., No. 2,998,969, of Sept. 5, 1961, discloses a type of weight balance unit generally similar to that of the present invention, but the latter is improved in terms of simplicity and ease of adjustment to accommodate the double egg-handling burden of the present machine.

SUMMARY OF THE INVENTION

Assuming an improvement in the machine over that of Page 2,731,146 in regard to the doubling of the capacity of the orbitally acting egg transfer units (by doubling the number of egg-supporting fingers on each), a doubling of the number of weight balancing units, as well as the conveyor belts to which they progressively deliver weighed eggs; then the gist of the invention, as compared with that of the patent, resides in an improved oscillatory-type egg-lifting and transfer unit or mechanism which is interposed between a fixed egg-holding unit supplied by the conveyor and the first of the series of orbital egg transfer units.

The oscillatory mechanism comprises a pair of U-shaped yokes, each of which straddles a ring gear (similar to that of the last-named patent) at a side of the machine; and these yokes are transversely coupled rigidly by means of an elongated rod or bar carrying a transversely spaced series of egg-lifting and transferring fingers. In the action of the oscillatory transfer unit, it is given a rocking motion compounded with its oscillation, under which its fingers first come upwardly from beneath eggs gravitating onto fixed egg supporting fingers, lift a leading row of eggs therefrom, and then carry them to a position in longitudinally spaced relation to a trailing series of eggs which have next followed onto and been cradled on the fixed fingers. As thus disposed, the two transverse rows of eggs are engaged from beneath by the orbiting transfer bar of the first of the gear-driven transfer units, with the result that that bar is occupied by a full complement of eggs in its orbital travel to the first weight balance unit 51. Customarily, there will be 12 pairs of egg-receiving and supporting fingers 15 on the fixed egg-holding unit, so that 24 eggs (instead of 12 as in Page 2,731,146) are transported to the first set of weight balance units. The same doubled capacity takes place at the resulting orbital-type transfer mechanisms.

BRIEF DESCRIPTION OF THE DRAWINGS

Figure 2:
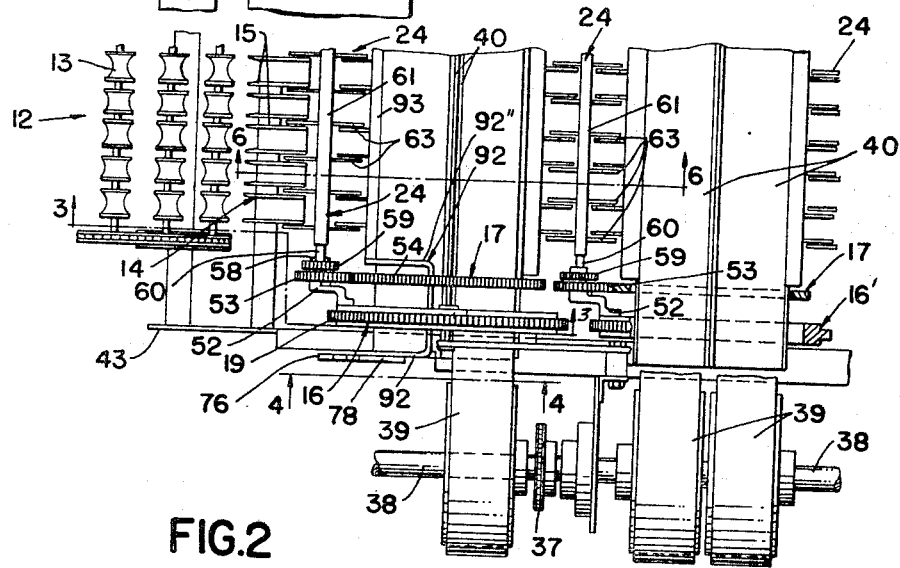
FIG. 2 is a fragmentary top plan view of the machine, being partially broken away and in horizontal section on line 2—2 of FIG. 1.

FIG. 4 is a view in side elevation, as from line 4—4 of FIG. 2, illustrating certain details of the important oscillatory-type egg pick-up and transfer mechanism of the invention, as well as means by which this mechanism is driven, the view omitting certain belt conveyor means in the interest of simplicity;

Figure 3:
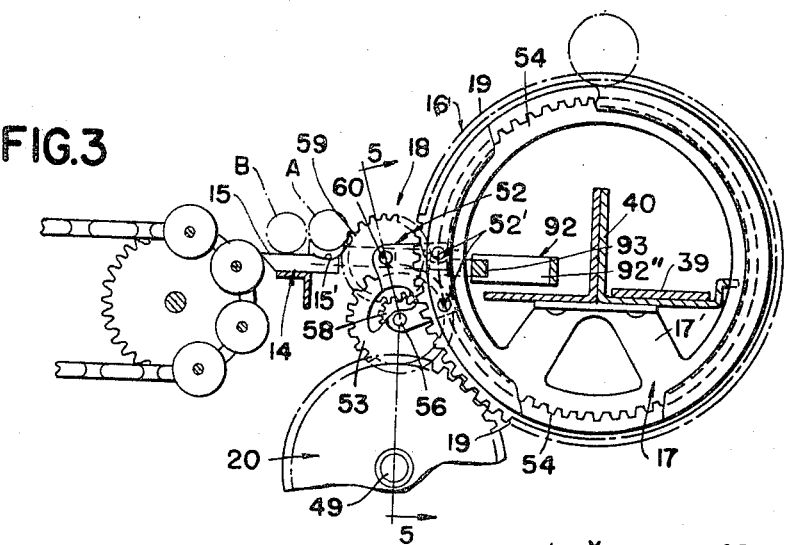
FIG. 3 is a fragmentary view in vertical longitudinal section along broken line 3—3 of FIG. 2, better showing the relationship of an improved orbiting transfer unit of the machine to a driven ring gear which operates that unit.
Figure 5:
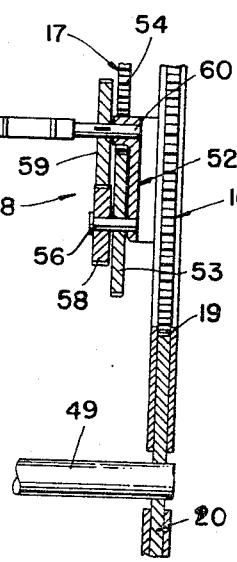

FIG. 5 is a fragmentary view in vertical transverse section along line 5—5 of FIG. 3, further illustrating details of the drive for the orbiting egg transfer unit;

FIG. 6 is a view in vertical and longitudinal section along a line corresponding to line 6—6 of FIG. 2, illustrating features of the improved weight-balance unit of the invention;

FIG. 7 is a fragmentary view in end elevation, as from line 7—7 of FIG. 6; and

FIG. 8 is a general and somewhat schematic view in vertical longitudinal section, illustrating the manner of cyclical operation of the succession of egg pick-up and transfer instrumentalities relative to the fixed egg delivery support and the weighing units.

DESCRIPTION OF A PREFERRED EMBODIMENT

The improved machine 10 of the invention is supplied with eggs to be weight-graded by a known type of continuously driven, spool-type conveyor 12; transversely spaced spools 13 of a succession of horizontal flights of this conveyor, under chain drive, deliver the eggs onto transversely spaced holders 14, each of which presents a pair of egg supporting fingers 15 having an egg cradling seat 15', as shown in FIGS. 6 and 8. A succession of longitudinally spaced, externally toothed ring gears 16, 16', 16" (FIG. 1) rotate on transverse parallel and longitudinally spaced axes, each coaxial with a fixed gear member 17, as shown in FIG. 3; and each ring gear is equipped with an orbiting, gear and pinion-type pick-up finger control unit 18 in the manner of Patent No. 2,731,146 mentioned above. Sets of balancing scale units, generally similar to what is shown in the two identified patents, but improved in certain respects thereover, are associated with each ring gear on the side thereof remote from conveyor 12. Gears 16, 16' and 16" are supported from beneath for rotation, and are rotatably driven at the teeth 19 thereof, by a series of longitudinally spaced gears 20, 20', 20" of smaller diameter, and these supported and supporting gears have annular smooth surfaces on either axial side of their meshing teeth, at which they have rolling engagement with one another, as in Patent No. 2,731,146. Likewise, a fixedly mounted axial restraining unit 21 is provided, which has grooved rollers 22 straddling the teeth of the ring gears 16, 16', 16", etc., and guiding and restraining the latter in the axial sense. In a typical installation, there will be a sufficient number of the gear rings 16, 16', 16" and associated weighing and other equipment to handle the grading, as to weight, of the six recognized egg classifications, ranging from jumbo down to pee-wee.

It is to be understood that the gearing at 16, 16', 16", 17 and 20, 20', 20", as well as the orbital gear and pinion units 18, restraining unit 21 and transfer unit 26 are duplicated at opposite sides of the machine frame, as in Page patent No. 2,731,146.

In accordance with the improvement of the invention, the rings 16, 16' and 16" are each equipped with an improved dual-type egg cradling pick-up bar, generally designated 24, whose motion is controlled by an orbiting unit 18 (FIG. 2). Furthermore, the ring gear 16 directly adjacent the fixed egg holders 14, has associated therewith an improved, oscillatorily acting, yoke-type transfer unit, generally designated 26, for co-action with the first dual-type pick-up unit 24.

The machine 10 is basically operated by a prime mover in the form of a gear-head motor 28 (FIG. 1) having its shaft equipped with a sprocket 29, from which a number of drives are derived. First of all, reference being had to FIG. 1, a chain 30 trained about the motor sprocket 29 extends upwardly around a further sprocket 31 journaled in an end extension 32 of the machine frame, designated 33; and a bevel gear 34 is coaxially secured to sprocket 31. It drives a further bevel gear 35 fixed on a longitudinally extending shaft 36 suitably journaled at its ends on frame 33. At the end remote from bevel gear 35, the shaft 36 has a sprocket secured thereon about which is trained a drive chain 37; and chain 37 extends upwardly around a further sprocket fixed on a longitudinally extending shaft 38.

Figure 1:
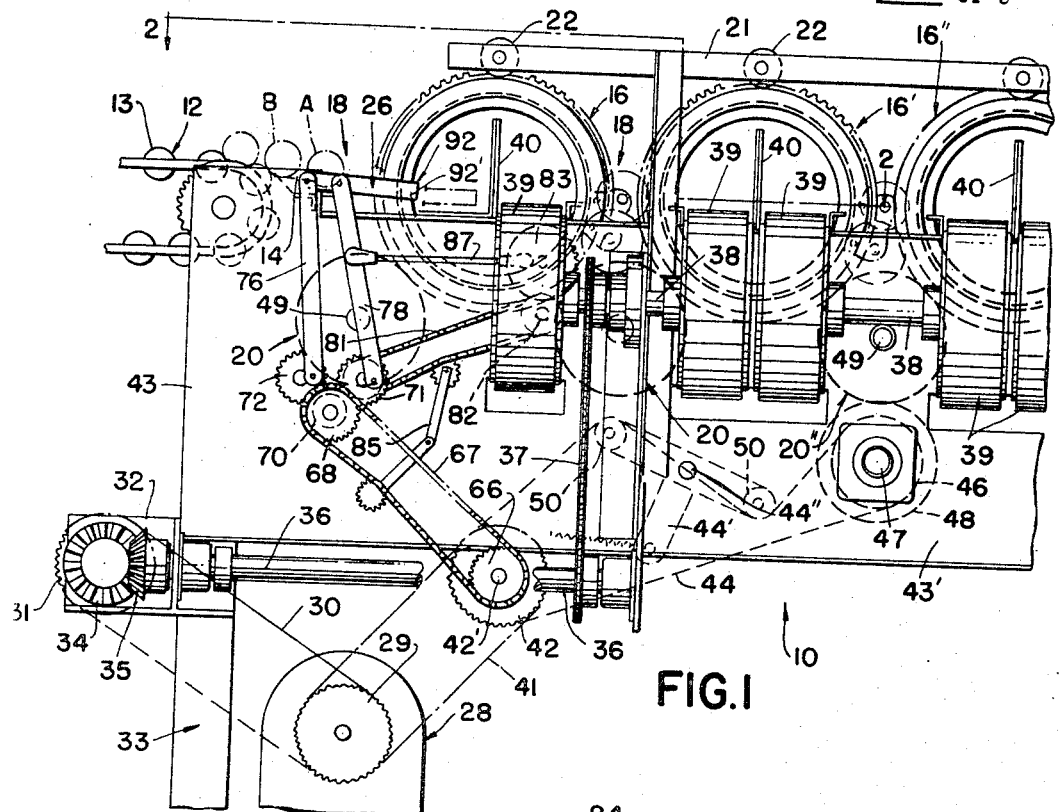
FIG. 1 is a side elevational view of a portion of the improved grading machine of the invention.

In the manner of Patent No. 2,731,146 identified above, shaft 38 drives a plurality of coaxial drums, about which horizontal egg conveyor belts 39 are trained. A first of these belts is associated with, and suitably guided relative to, the first fixed gear 17 which is disposed coaxially within the first ring gear 16; and two of the belts 39 are internally associated with each of the following ring gears 16', 16", etc., as illustrated in FIGS. 1, 2 and 8.

The upper reaches of belts 39 are slidably supported, as shown in FIGS. 1, 2, 3, 6 and 7, on L-shaped plates 40 rigidly secured atop an inner part of 17' of the fixed gear 17.

The shaft of the motor 28 which carries the sprocket 29 also has a further sprocket of equal diameter thereon (FIG. 1) which drives a chain 41. This, as shown in FIG. 1, is trained upwardly and to the right about a sprocket 42 suitably journaled beneath a pair of parallel, upright sheet metal side plates 43 of the superstructure of the machine 10, as by a shaft 42' borne in brackets beneath the plates.

Shaft 42' has a second sprocket journaled thereon, equal in diameter to the sprocket 42; and another chain 44 is trained about said second sprocket, this chain having the function of driving the several ring gears 16, 16', 16", etc. To this end, chain 44 passes about a sprocket 46 journaled in a rear extension 43' of one of the frame side plates 43, as on a journal box-borne shaft 47; and a gear 48 fixed on this shaft has driving engagement with the rear ring gear 20".

As indicated above, the pairs of axially aligned gears 20, 20', 20", etc., as pivoted on cross shafts 49 carried by side plates 43 and their extensions 43', cradle and mesh respectively with the floating ring gears 16, 16', 16", etc., with the drive of the respective ring gears being a positive one originating at the gear 48. Tension in the drive chain 44 is maintained by a spring-biased rocker member 44' of T-shape which is pivoted on the frame at 44' and has rollers 50 about which the chain is trained.

The motor driven shaft 42 is also the source of drive for the improved oscillatory transfer unit 26 in accordance with the invention, as will be hereinafter described.

Each of the orbital gear and pinion units 18 acts, as described and illustrated in the Patent No. 2,731,146 identified above, to provide a transport of the weighed eggs product orbitally about the axis of a gear 16, 16', 16", etc., to a weighing balance unit, generally designated 51 (FIGS. 6 and 8) on the rear side of the ring gear.

The arrangement in each case comprises a set of toothed rotary members journaled in a yoke 52 (FIGS. 3 and 5), which yoke is riveted at 52' on the ring gear 16, 16' or 16" radially inwardly of the external teeth thereof. Yoke 52 has a gear 53 rotatably journaled in a portion thereof, which gear 53 meshes with the teeth 54 of fixed gear 17. Thus, upon rotation of ring gear 16 by the drive gear 20, the yoke 52 will "walk" around the fixed gear 17.

Yoke 52 also rotatably journals at 56 (coaxially of gear 53) a small pinion 58, which is in mesh with a gear 59 rotatably mounted by another portion of the yoke of unit 18. The journal at this portion is through the agency of the cylindrical extremity 60 of a transversely elongated square shaft 61 of the egg pick-up bar 24, the gear 59 being keyed or otherwise fixedly secured to the cylindrical shaft extremity 60.

Accordingly, a clockwise drive of ring gears 16, 16', 16" will cause the orbit of each of the control units 18, 18', 18" about the gear axis, accompanied by a counterclockwise rotation of each pick-up bar 24 about its own axis at its square shaft 61, thus to transport eggs from a receiving position to a discharge and weighing position, without departure of the pick-up bar 24 from a horizontal position.

The action is the same as in Patent No. 2,731,146; however, as best shown in FIGS. 2, 6 and 8, each bar 24 equipped with transversely spaced pairs of egg pick-up fingers 63 projecting from each of the horizontally opposite sides thereof, rather than from only one side, as in the patent, so as to receive a full complement of 24 eggs from holder 14 and transfer mechanism 26. Each finger 63 has a concave egg cradling seat 64, and the fingers are in general longitudinal alignment with the fixed holders 14 (FIG. 2), as well as with egg pick-up fingers of the yoke-type oscillatory transfer unit 26, by which the capacity of machine 10 is doubled, in an action now to be described.

OSCILLATORY TRANSFER MECHANISM

Figure 4:
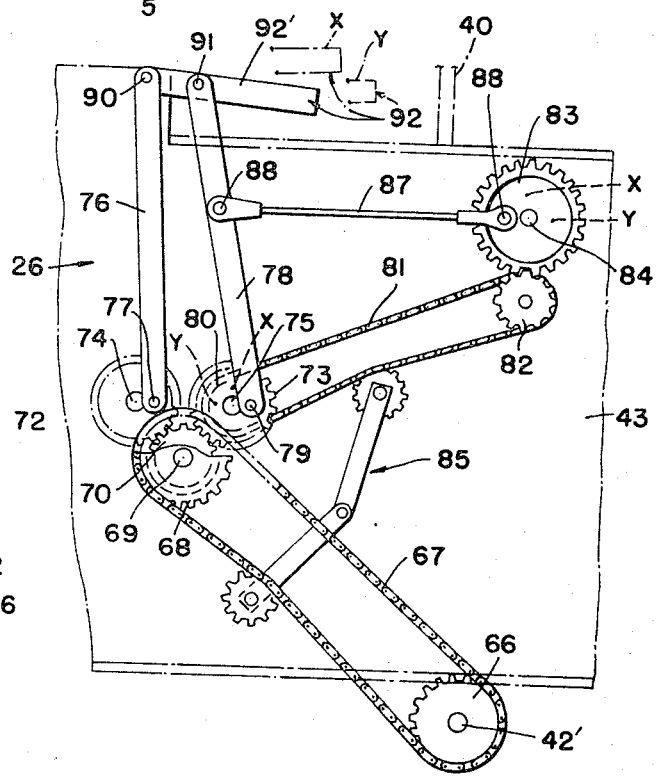

This important aspect of improvement of the invention is illustrated in FIGS. 1, 2 and 4 of the drawings, consideration being also given to FIGS. 6 and 8 in regard to the operation connection with FIG. 1.

The drive means for unit 26 is best illustrated in FIG. 4, reference being also had to FIG. 1. As therein shown, the shaft 42' upon which sprocket 42 is secured also has another smaller diameter sprocket 66 fast thereon or clustered therewith, about which a chain 67 is trained, passing upwardly and to the left around a further sprocket 68 which is fastened on a transverse elongated shaft 69 journaled at its ends in machine frame side plates 43; and the yoke-operating structure of oscillatory transfer unit 26 (as hereinafter described) is duplicated at the opposite side of the machine, across which the shaft 69 extends. Sprocket 68 is coaxially secured to a smaller diameter pinion 70, which pinion meshes with two gears 72, 73 of equal diameter journaled respectively in the opposite side plates 43, as by stub shafts 74, 75.

The gear 72 has a first oscillatory, upright link 76 eccentrically pivoted thereon at 77. The gear 73 has a similar second oscillatory, upright link 78 eccentrically pivoted thereon at 70, and the gear 73 is fixedly secured coaxially to a smaller diameter sprocket 80, about which a drive chain 81 extends. Chain 81 is trained upwardly and to the right, as viewed in FIG. 4, where it passes about and drives a further sprocket coaxially secured to a pinion 82 of equal diameter, which is journaled in machine side plate 43. Pinion 82 in turn meshes upwardly with a larger diameter gear 83 having a journal in the side plate at a stub shaft 84. Tension is maintained in the chains 67 through the agency of an appropriate spring-biased, idler-type take-up sprocket unit, generally designated by the reference numeral 85. An elongated connecting rod 87 is eccentrically pivoted at one end on the gear 83, and its opposite end is pivoted at 88 to an intermediate point on the second upright oscillatory link 78.

Finally, the upper ends of the links 76, 78 are pivotally connected at 90, 91, respectively, to a U-shaped pick-up yoke 92 (see also FIG. 2) of the oscillatory transfer unit 26, these pivots being respectively at the end of and spaced somewhat from the end of an outer arm 92' of the yoke. The structure is, as indicated above, duplicated at the opposite side plates 43 of machine 10, each of the yokes 92 radially outwardly straddling the left-hand ring gear 16 and fixed gear 17 in the direction toward the egg receiving holder 14.

As best shown in FIGS. 2, 6 and 8, the two U-shaped yokes 92 have their inner arms 92" rigidly connected to one another by an elongated cross rod or bar 93 of rectangular cross section; and this rod carries transversely spaced pairs of egg pick-up fingers 94. These fingers are in general longitudinal alignment with the fingers 63 of the orbiting egg pick-up bar 24 and the fingers 15 of the fixed egg receiving holder 14, as best shown in FIG. 2, the respective sets of fingers 63 outwardly overlapping those of yoke rod 93 and those of the fixed member 14. As in the case of the other fingers 15 and 63, and as shown in FIG. 6, the yoke fingers 94 have upwardly concave egg-cradling sets 95.

By reason of the eccentric pivoting of links 76, 78 on the gears 72, 73 and the eccentric pivoting of connecting rod 87 on gear 83, the links transmit to the yoke 92 an irregular oscillatory and rocking motion generally depicted in FIG. 4. Thus, in the solid-line position of yoke 92 shown in that figure, the yoke is in an extreme leftward position in which the cradling seats 95 of its pick-up fingers 94 will underlie the cradling seats 15' of the egg-receiving fingers 15 of holders 14, with the eccentric pivots 77, 79 of the links 76, 78 to gears 72, 73 being about as shown in solid line. Then, as the pivot 79 passes counterclockwise to and through the position designated $x$ in FIG. 4, yoke 92 swings and rocks to and through the dot-dash line position (also designated $x$); and upon further rotation of link pivot 79, as to the position designated $y$, yoke 92 swings and rocks to the similarly designated position $y$ in FIG. 4, which approximates the extreme rightward position thereof.

The result of this compounded oscillatory yoke motion (see FIGS. 3, 6 and 8) is that the seats 95 of yoke 92, when the latter is in the extreme left position at the beginning of a pick-up cycle, are in position to pick up leading eggs A, which have come to rest on the fixed seats 15', and transfer them to the right-hand position of FIGS. 6 and 8, whereupon other eggs B (which are pushed forward on fingers 15 by still further eggs of a following row) roll onto seats 15'. With eggs A and B thus disposed and supported in predetermined longitudinal spacing from one another on the respective seats 95, 15', they are then engaged from beneath by the equally spaced seats 64 on the fingers 63 of egg pick-up bar 24, being lifted by that bar as it orbits clockwise in true horizontal orientation and in accurately timed synchronization with the irregular motion of the oscillatory transfer unit 26.

In order to prevent possible breakage of the trailing eggs B as they gravitate to rest against eggs A on the fixed holding seats 15', the fingers 15 are positioned at a properly and slightly lowered elevation relative to the initial pick-up point by the oscillatory yoke fingers 94, thus to prevent the leading eggs A on holders 14, in being initially lifted, from disturbing those just behind, as by pushing them to the left with a possibility of going askew and falling off the holders.

The transfer action is best illustrated in FIG. 8, in which, assuming the orbit of the first or left-hand pick-up bar unit 26 as being in the circular arc X, the orbital paths of the eggs A and B are in the eccentric arcs A' and B' respectively. Upon completion of 180° transfer in these yokes, eggs A and B are delivered to the first set of "jumbo" weighing balance units 51, which are themselves of an improved type, later described. This occurs identically in the orbital action of the remaining bar units 26 associated with the ring gears 16', 16", etc., in grading lighter eggs.

The machine 10 differed essentially and importantly from the disclosure of Patents Nos. 2,731,146 and 2,988,969 in that while, like their equipment, it picks up an egg B outside the orbit X of transfer bar 24. transports it in an arc B' and deposits it inside the orbit, it also picks up another egg A inside the bar orbit X and deposits it outside that orbit. The result is a maximum saving of space, considering the doubled output capacity.

It is seen that, by the simple provision of the oscillatory pick-up unit 26 in association with a first double-capacity orbiting pick-up bar unit 24, and of similarly doubling the holding ability of the remaining units 24, the output of the machine 10 is doubled, without in any great degree increasing the floor need of the latter, and by only insignificantly increasing its complexity and cost.

WEIGHING BALANCE UNIT

One of these units or mechanisms, generally designated 51 is positioned relative to each egg delivery belt 39 in the relationship illustrated in FIG. 6, a section along 6—6 of FIG. 2, i.e., on a longitudinal line centrally of the transfer fingers 63 of each pair thereof on the transfer bar unit 24. As to weighers 51 associated with the second and succeeding ring gears 16', 16'', they will naturally be oriented oppositely to one another, as appears in FIG. 8, ejecting graded eggs in opposite directions onto the transfer belts 39 supported by the fixed gears 17 of those sub-assemblies. Each adjacent pair of weighers 51 grades eggs for the same weight value.

As best shown in FIGS. 6 and 7, each balance unit 51 comprises an elongated, longitudinally extending scale beam 98 which is thickened and of square cross section F–99 on its left-hand end (FIG. 6). A small coil spring 100 is seated downwardly into this portion, reacting upwardly against a plate 101 which is bolted or otherwise secured to a belt guide angle 40. The beam 98 is pivotally mounted at 102 to a depending bracket 103 on plate 101, and on either side of beam 98 opposite its pivot the beam is equipped with an adjustable stop or set screw 104 to adjustably limit swing thereof.

Beam 98 has an offset at 106, to either side of which there is secured, as by riveting at 107, a sheet metal finger 108; and these fingers have arcuate seats 109 onto which an egg B is deposited by orbiting transfer bar 24 for weighing. Similar finger construction, of course, characterizes the oppositely oriented weighers 51 which receive eggs A.

Each pair of fingers 108 serves to pivotally mount therebetween, at 111, an egg ejector or kicker arm 112, whose function is to kick onto the conveyor belt 39 any egg which over-poises the scale beam 98; and each such kicker arm 112 is provided with an integral offset, plate-like flange 113. In the manner of the patent to Page et al., 2,998,969, an operating rocket arm 115 of each weigher 51 is clamped on an elongated cross shaft 116 appropriately journaled in the side walls 43 of the machine 10; and arm 115 is adapted to be operated, as in the patent, by a member 117 having cyclic movement in accurately timed relation to the movement of the transfer bar unit 24. A small trip arm 118 for each weigher 51 is also clamped on the shaft 116 to oscillate with rocker arm 115; and the arm 118 will normally pass beneath, and fail to trip, the kicker flange 113 in the absence of an egg of adequate weight to counter-balance beam 98. However, when an egg of such counter-balancing weight is delivered to fingers 108, beam 98 swings clockwise about its pivot end 102, bringing the flange 113 into the path of rocker arm 118. Thus, on the next cyclical operation of the latter, it will strike the flange, swing the kicker arm 112 counter-clockwise about its pivot at 111 and discharge the weight-graded egg onto the delivery belt 39.

As a further improvement in the balance weigher unit 51, the beam 98 is counter-poised by means of a weight 120 threadedly adjustable on a screw 121, which screw is fixedly carried by a depending plate 122 applied to the left-hand end of scale beam 98. This permits a quick, accurate and easy adjustment of the counter-poise effect on each of the sets of weighers 51.

The operation of successive transfer units 24, 24 is depicted in FIG. 8. The first of these, after picking up eggs A and B from fixed holder 14 and transfer unit 26, carries them in the respective arcs A', B' and deposits them upon the adjacent weigher fingers 51 located between the first two egg delivery belts 39. Weighers 51 then act in timed relation to the transfer units 24 and 24 to kick "jumbo" eggs in opposite directions onto the belts, by which they are delivered and accumulated at a side of the machine. With the lighter eggs remaining upon the unoverbalanced weigher fingers 108, the second orbital transfer bar 24 picks them up on its fingers 63, and transports them in the arcuate paths A' and B' to the next succeeding pair of weigher units 51, where they are graded as to "extra large" size, and so on. A needed adjustment of the counter-poise of successive weighers 51, to set them accurately for the six established grades, involves simply a rotation of counter-weights 120 of the beams 98; and the beams are stably held in position to receive the eggs by the co-acting coil spring 100 and set screw 104.

Thus it is seen that although the machine involves fixed holding means, orbital transfer units, weighers and egg delivery belts which are of the same general sort as shown in Patents Nos. 2,731,146 and 2,998,969, but paired in some instances, the presence of the combined oscillatory and rocking-motion transfer mechanism 26 imparts a character to the improved machine which differs essentially from what is shown in the patents. As provided with a total of 120 weighers 51 to handle the entire range of egg sizes, the improved machine is capable of grading 60 dozen eggs per minute, compared with a 30 dozen/minute output of the earlier machine.

What is claimed is:

1. In a grading machine for eggs which has a conveyor successively supplying rows of eggs, a fixed holder successively receiving and supporting said rows, and an egg transfer unit having means moving it to transport eggs to a balance unit at which the eggs are weight-graded; the improvement comprising an egg transfer mechanism disposed between said holder and said transfer unit, said mechanism having means imparting movement thereto to pick up a leading row of eggs from said holder and transport that row to another position longitudinally spaced from a following row on the holder, said transfer unit having means then picking up and transporting both of said rows to the balance unit.

2. The machine of claim 1, in which said transfer unit and mechanism have means driving the same in accurate synchronization with one another.

3. The machine of claim 1, in which there are a pair of said egg transfer units in longitudinal succession and a pair of said weight-grading balance units between said transfer units respectively receiving and grading said rows of eggs transported thereto by a first of the transfer units, the second of said transfer units then transporting ungraded eggs to a further balance unit.

4. In a grading machine for eggs which has a conveyor successively supplying rows of eggs, a fixed holder successively receiving and supporting said rows, and an egg transfer unit having means orbiting it in a vertical plane to transport eggs to a balance unit at which the eggs are weight-graded; the improvement comprising an egg transfer mechanism disposed between said holder and said transfer unit, said mechanism having means imparting an oscillatory motion thereto to pick up a leading row of eggs from said holder and transport that row to another position longitudinally spaced from a following row on the holder, said transfer unit having means then picking up and orbitally transporting both of said rows to the balance unit.

5. The machine of claim 4, in which said transfer unit and mechanism have means driving the same in accurate synchronization with one another.

6. The machine of claim 4, in which said transfer unit and mechanism have means driving the same in accurate synchronization with one another, including interconnected and positively driven gear and link means to cause said oscillation of the transfer mechanism and said leading egg row to and from said other position of the row.

7. The machine of claim 6, in which said gear and link means includes connections to superimpose a bodily rocking action on said oscillatory motion.

8. The improvement of claim 7, in which said fixed holder, said orbiting transfer unit and said oscillatory transfer mechanism all have transversely arranged sets of egg supporting fingers arranged in a general longitudinal alignment of the respective sets with one another, said transfer unit comprising an orbitally driven bar having two sets of said fingers projecting oppositely therefrom in the plane of the orbit.

9. The improvement of claim 6, in which said fixed holder, said orbiting transfer unit and said oscillatory transfer mechanism all have transversely arranged sets of egg supporting fingers arranged in a general longitudinal alignment of the respective sets with one another.

10. The machine of claim 4, in which said means imparting oscillatory motion to said transfer mechanism includes connection to superimpose a bodily rocking action on said oscillatory motion.

11. The improvement of claim 4, in which said fixed holder, said orbiting transfer unit and said oscillatory transfer mechanism all have transversely arranged sets of egg supporting fingers arranged in a general longitudinal alignment of the respective sets with one another.

12. The improvement of claim 4, in which said fixed holder, said orbiting transfer unit and said oscillatory transfer mechanism all have transversely arranged sets of egg supporting fingers arranged in a general longitudinal alignment of the respective sets with one another, said transfer unit comprising an orbitally driven bar having two sets of said fingers projecting oppositely therefrom in the plane of the orbit.

13. The machine of claim 12, in which there are a pair of said orbital egg transfer units in longitudinal succession and a pair of said weight-grading balance units between said transfer units, said balance units respectively receiving and grading said rows of eggs transported thereto by a first of the transfer units, the second of said transfer units then transporting ungraded eggs to a further balance unit.

14. The machine of claim 4, in which there are a pair of said orbital egg transfer units in longitudinal succession and a pair of said weight-grading balance units between said transfer units, said balance units respectively receiving and grading said rows of eggs transported thereto by a first of the transfer units, the second of said transfer units then transporting ungraded eggs to a further balance unit.

15. In an egg grading machine having moving conveyor means to receive and deliver graded eggs, a balance including a beam pivotally mounted between the ends thereof on a fixed support egg cradling means on one end of said beam, a device pivotally mounted on said beam end and operative to displace graded eggs from said cradling means to said conveyor means, a counterweight having a threaded connection to said beam on the side of the beam pivot opposite said cradling means and device, thus to provide a quickly and accurately adjustable counterpoise of the beam, and a coil spring acting directly between said fixed support and said beam to bias the latter against the weight of an egg on said cradling means.

References Cited

UNITED STATES PATENTS

| | | | |
|---|---|---|---|
| 2,731,146 | 1/1956 | Page | 209—121 |
| 2,998,969 | 9/1961 | Page | 209—121 X |
| 3,002,620 | 10/1961 | Marzolf | 209—121 |

ALLEN N. KNOWLES, *Primary Examiner.*

R. A. SCHACHER, *Assistant Examiner.*

U.S. Cl. X.R.

198—120